July 21, 1964  J. D. RUSSELL  3,141,232
METHOD FOR PRODUCING STRAIN GAGES
Original Filed Aug. 14, 1958  5 Sheets-Sheet 1
FIG. 1
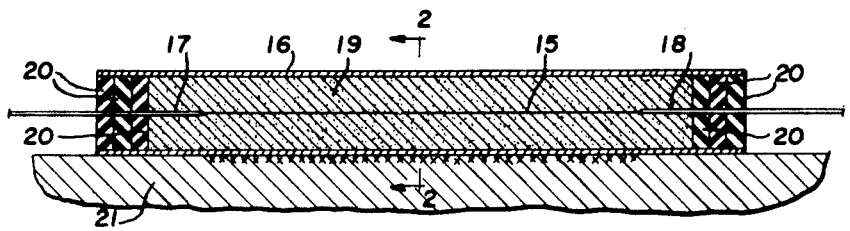
FIG. 2
FIG. 3
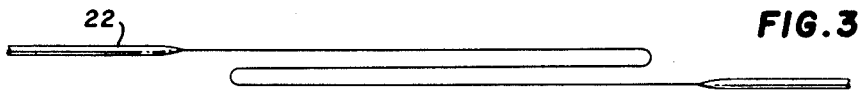
FIG. 4
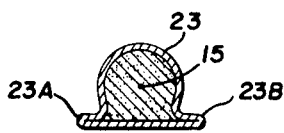
FIG. 5
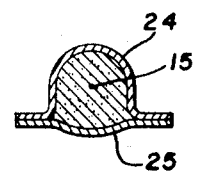
FIG. 6
FIG. 7
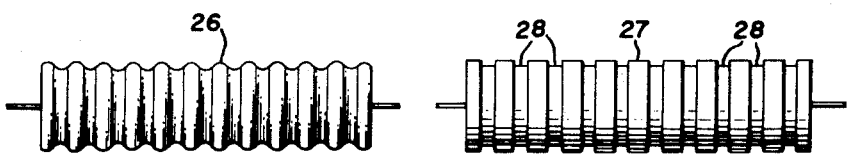
FIG. 8
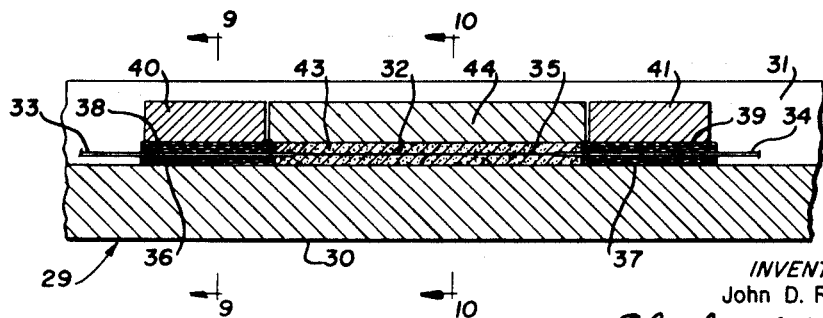
INVENTOR
John D. Russell
BY *Charles J. Elderkin*
ATTORNEY July 21, 1964  J. D. RUSSELL  3,141,232
METHOD FOR PRODUCING STRAIN GAGES
Original Filed Aug. 14, 1958  5 Sheets-Sheet 2

INVENTOR.
John D. Russell
BY
Charles J. Elderkin
ATTORNEY

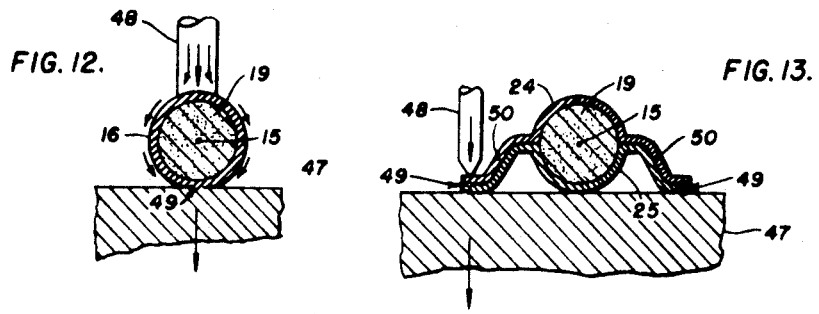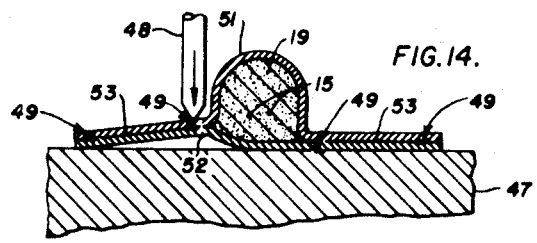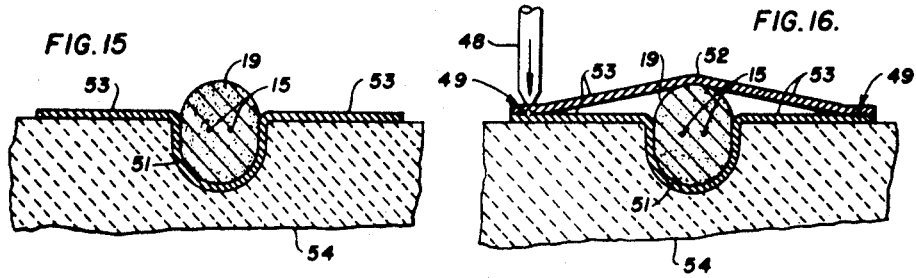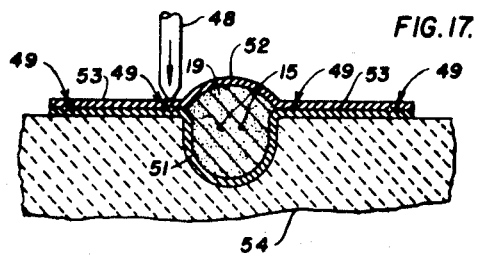

July 21, 1964 J. D. RUSSELL 3,141,232
METHOD FOR PRODUCING STRAIN GAGES
Original Filed Aug. 14, 1958 5 Sheets-Sheet 4

INVENTOR.
John D. Russell
BY Charles J. Elderkin
ATTORNEY

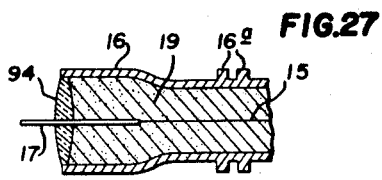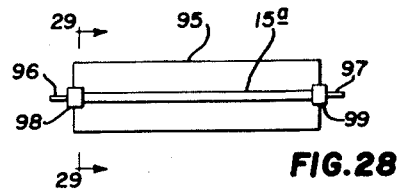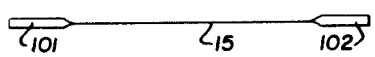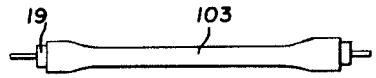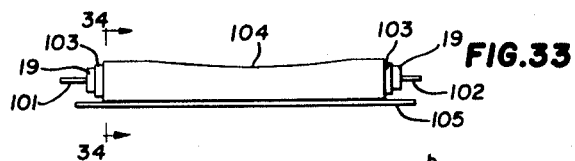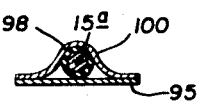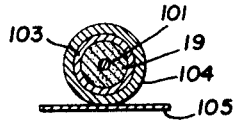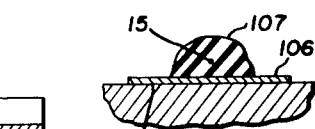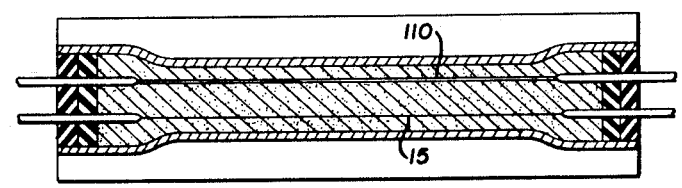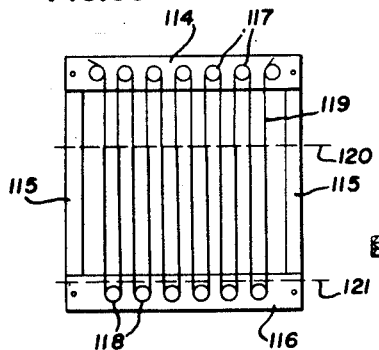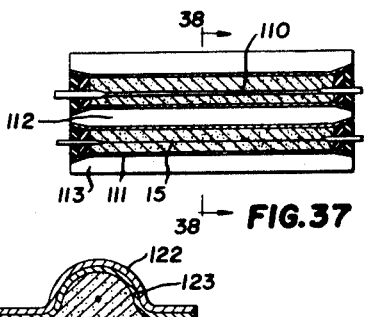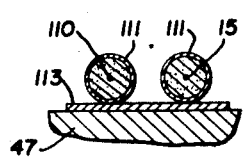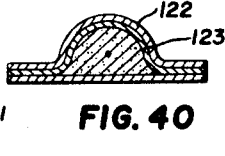

3,141,232
METHOD FOR PRODUCING STRAIN GAGES
John D. Russell, Hollywood, Calif., assignor to Microdot Inc., South Pasadena, Calif., a corporation of California
Original application Aug. 14, 1958, Ser. No. 754,956. Divided and this application June 8, 1960, Ser. No. 37,017
3 Claims. (Cl. 29—155.5)

This invention relates to improvements in resistance wire strain gages for measuring strain in a body subjected to variable stress. More particularly, the invention contemplates the provision of improved strain gages of the resistance wire or filament type which are especially characterized by their extreme adaptability for both low temperature and high temperature measurement work, and by their relative ease of installation as compared with gages heretofore employed by industry. The invention further contemplates the provision of improved methods and procedures for the manufacture, installation and operation of resistance wire type strain gages as well as for the manufacture and assembly of component parts thereof.

This application is a division of United States application Serial No. 754,956 filed August 14, 1958, which in turn constitutes a continuation-in-part replacement of application Serial No. 390,938 filed November 9, 1953, and application Serial No. 492,091 filed March 3, 1955, both now abandoned.

Strain gages of the resistance wire or filament type have been in use for some time for measuring variable quantities such as strain, pressure, torque, acceleration, temperature, etc. The typical resistance wire strain gage contains a resistance wire or filament connected in a conventional four-arm bridge circuit which ordinarily is balanced. The force to be measured is coupled mechanically to the resistance wire by various means, such that the force exerted on the wire through the coupling means causes the dimensions of the wire to be altered, which results in a proportional change in the resistance of the wire. This in turn causes unbalancing of the bridge in an amount at least roughly proportional to the force applied to the wire.

At the present time two different methods are used for mounting the resistance element in most gages of the general class described. The first such method is commonly referred to as the "bonded method." In accordance with this method, the resistance wire is bonded by means of cement, glue or similar adherent to the surface of a sheet of an insulating material, usually paper. The ends of the wire are adapted to be connected to form one arm of a conventional four-arm bridge circuit. The insulating material or paper is in turn adapted to be bonded by an adherent to a test specimen in which strain is to be measured. Strain applied to the specimen is transmitted through the bonded paper to the wire and the resulting change in the dimensions and resistance of the wire is indicated by the relative degree of unbalancing of the bridge circuit. Suitable calibration provides means for measuring the amount of strain present in the test specimen.

The so-called "bonded method" for mounting a resistance wire for use in gages of the type described is generally satisfactory at relatively low temperatures. However, high temperature measurement work with the bonded wire type of gage is not possible because of the effects of such temperatures on the bonding substance or adherent. A further disadvantage of the bonded wire gage is that a substantial curing period is required after the strain gage has been mounted on the test specimen to permit the cement or adherent to establish a firm strain-coupling bond between the test specimen and the paper carrier of the resistance element.

The second method for mounting a resistance wire for use in such gages is the so-called "unbonded method." In the unbonded method the strain wire is stretched around insulating supports which are adapted to be made movable with respect to each other in response to a strain introduced into the test specimen to which the gage is attached. This type of mounting has the disadvantages that a pre-stress must be applied to the wire when it is mounted on the insulating supports so that it can be used to measure compressive forces satisfactorily, and the unit is not adaptable for use on curved surfaces.

The present invention contemplates the provision of improved strain gages of the resistance wire type which overcome the principal disadvantages and limitations of the previously known bonded gages and unbonded gages, being adapted for coupling or attachment to the test specimen without the use of temperature-sensitive adherents, as in the conventional bonded gages, and without requiring that the resistance element or elements be pre-stressed, as in the conventional unbonded gages. The gages of the invention have the additional advantage of being equally well adapted for use under extreme temperature conditions and for ordinary or ambient temperature measurement work. In addition, the gages of the invention are well adapted for use with test specimens having curved or irregular surfaces.

Broadly, the invention provides improved strain gages which are attachable to the test specimen in such fashion that a strain-responsive coupling is attained over the entire effective length of the resistance filament contained within the gage, and without the use of cements or other sensitive bonding materials. In accordance with the various different structural embodiments of the invention, the strain gages are so constructed that they can be welded to the test specimen, either by application of normal arc welding techniques or sonic welding, to provide an instantaneous, rigid coupling between the test specimen and resistance filament along the entire length of the filament.

In generalized form, the gages of the invention may comprise a resistance wire or strain-responsive filament carried by a supporting element, such as an external housing, usually of metal, and mechanically locked to the supporting element by means of a dense mass of insulating material in such fashion that longitudinal changes in the dimension of the supporting element caused by deformation of a test specimen to which it is attached are imparted to the resistance wire or filament via the mass of insulating material. Thus, for example, the insulating material may be a compactible or compressible solid possessing both thermal and electrical insulating properties, which is deposited around the filament and enclosed within a metallic tube permanently deformed, as by drawing, crimping, etc., to exert a compressive force on the insulating material, thereby forcing it into firm compressive contact against the resistance element and effectively frictionally coupling the element to the external tube. Accordingly, with the tube attached along its entire length to a test specimen, strain applied to the tube from the test specimen is transmitted through the insulating material and hence to the resistance element contained therein. The resistance element is arranged for connection in a suitable electrical measuring network, such as a balanced bridge circuit, so that the changes in dimension of the test specimen caused by strain can be measured as a function of the correspondingly changed resistance of the filament. In still other embodiments of the invention, the gage may be assembled for ambient temperature measurement work by simply mounting the filament within a mass of insulating cement which is in turn mounted on a metallic flange adapted to be attached to a test specimen by welding, or, the strain-responsive filament may be coated directly with an oxide deposit with the combined unit then being firmly compressed within a suitable weldably-attachable housing, or the external housing may be formed integrally with the oxide-coated filament by electro-depositing a metallic coating around the same.

The external housing of the gage preferably is formed of a freely-yielding or deformable material such, for example, as thin sheet steel, stainless steel, platinum, aluminum, tungsten, tungsten alloys, etc., which is readily adaptable for rigid bonding, as by welding, to a metallic test specimen. In this manner, the gage can be securely fastened to a test specimen very quickly and may be used for measurement work immediately thereafter, i.e., without the necessity of waiting for a bond to set or cure as in the conventional types of bonded gages. The unique structural characteristics of the gage permit it to be mounted by welding over its entire length to either a flat or curved surface and without danger of damaging or shorting the internal resistance wire or filament which is electrically insulated from the housing by the surrounding mass of insulating material, and also render the gage adaptable for high temperature measurement work due to the thermal insulating properties of the assembly, as well as measurement work performed under ordinary or ambient conditions of temperature. Furthermore, the gage may be used for measurement of both tension and compression without the necessity of pre-stressing the resistance filament in the manner required for conventional gages of the unbonded type.

Particularly advantageous embodiments of the invention provide for novel assembly of the gage parts to facilitate attachment of the gage by welding; assure that the resistance element is satisfactorily strain-coupled to the housing via the insulating media; accomplish sealing of the structure if necessary or desirable; simplify installation for tests, particularly in certain difficult test applications; achieve ease of calibration; provide increased mechanical strength of strain gage elements; provide for simultaneous measurement of strain and temperature at substantially the same point; and afford numerous other advantages as will become apparent from the following detailed description of such embodiments taken in conjunction with the accompanying drawings wherein:

FIG. 1 is a longitudinal sectional view of a typical strain gage of the invention shown in operative position with respect to a test specimen;

FIG. 2 is a sectional view taken along line 2—2 of FIG. 1;

FIG. 3 is an elevational view of a modified form of resistance element useful in the device of FIG. 1, as well as in other gage structures of the invention;

FIGS. 4 and 5 are transverse sectional views illustrating, in cross-section, two modified forms of strain gage embodying the principles of the invention;

FIGS. 6 and 7 are side elevational views illustrating alternative forms of external housing for the strain gage of FIG. 1;

FIG. 8 is a longitudinal sectional view illustrating another form of strain gage of the invention, and the manner in which the same is attached to a test specimen;

Figure 9:
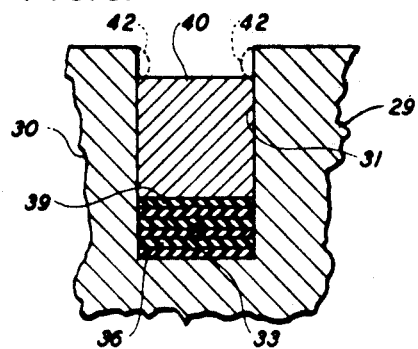
Figure 10:
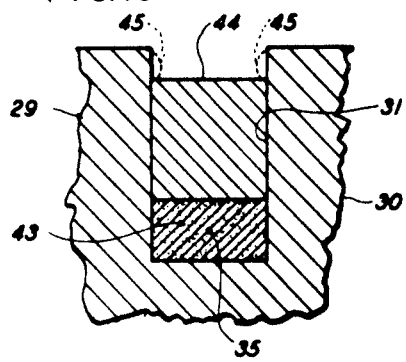
Figure 11:
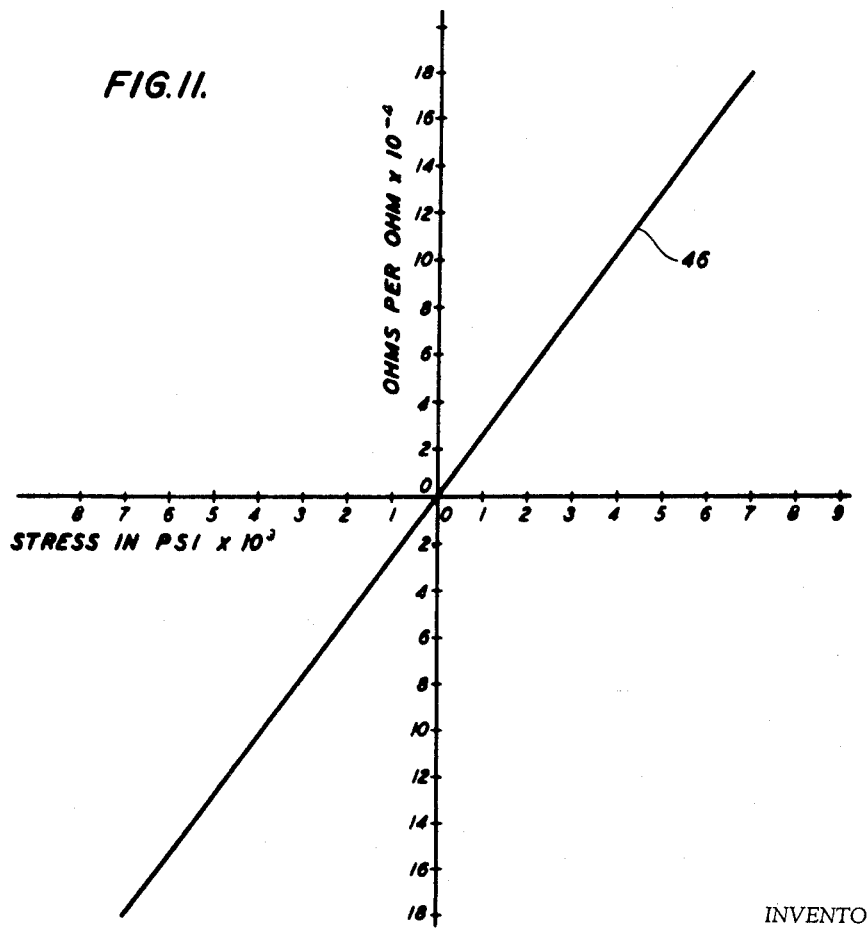
Figure 18:
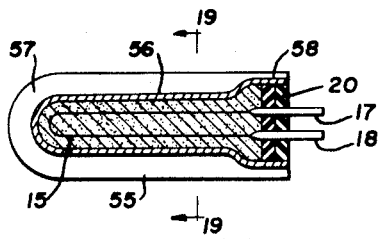
Figure 19:
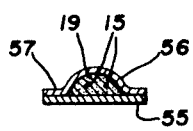
Figure 20:
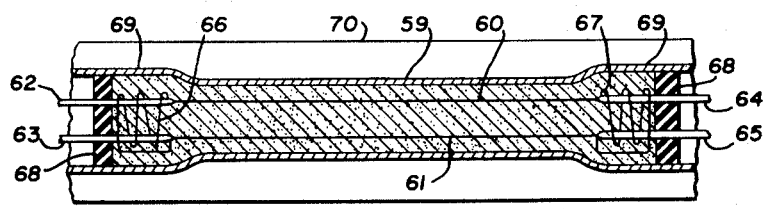
Figure 21:
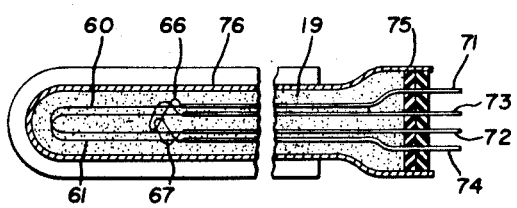
Figure 22:
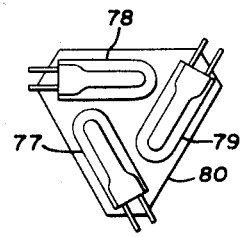
Figure 23:
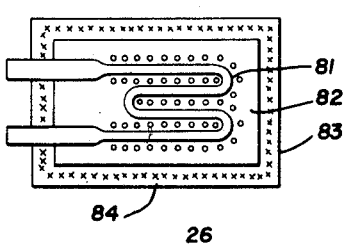
Figure 24:
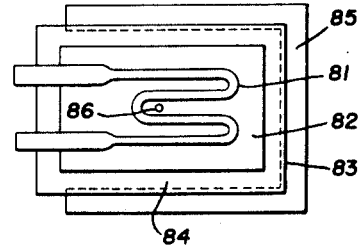
Figure 26:
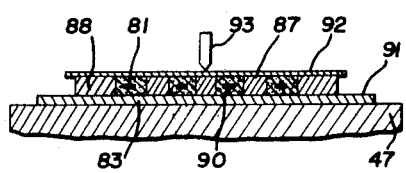
Figure 25:
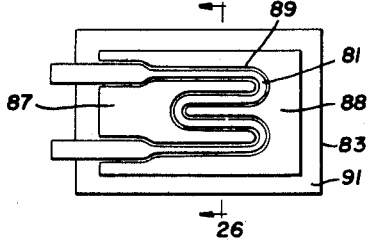

FIGS. 9 and 10 are transverse sectional views taken along lines 9—9 and 10—10, respectively, of FIG. 8;

FIG. 11 is a graphical illustration showing the performance characteristics of a strain gage of the type illustrated in FIGS. 8–10;

FIG. 12 is a transverse sectional view illustrating the manner in which a strain gage of the type illustrated in FIG. 1 can be welded to a metallic test specimen;

FIGS. 13 and 14 are transverse sectional views illustrating strain gages, constructed in accordance with additional embodiments of the invention, and the manner in which the same are welded to metallic test specimens;

FIGS. 15–17 are transverse sectional views illustrating in sequential steps one advantageous method for assembling the strain gage of FIG. 14;

FIG. 18 is a view, partly in top plan and partly in horizontal section, of a strain gage in accordance with another embodiment of the invention;

FIG. 19 is a transverse sectional view taken along line 19—19 of FIG. 18;

FIG. 20 is a view, partly in top plan and partly in horizontal section, of a further strain gage structure incorporating the principles of the invention;

FIG. 21 is a view, similar to FIG. 18, showing a strain gage made in accordance with a still further embodiment of the invention;

FIG. 22 is a plan view illustrating a plurality of strain gages, of the type illustrated in FIG. 18, secured to a single metallic support in the form of a unit assembly;

FIGS. 23–25 are plan views illustrating foil-backed strain gages constructed in accordance with the principles of my invention;

FIG. 26 is an enlarged sectional view taken along line 26—26 of FIG. 25;

FIG. 27 is a fragmentary view, in longitudinal section, representing a modified form of strain gage of the invention;

FIG. 28 is a plan view illustrating the manner of constructing another form of strain gage in accordance with the invention;

FIG. 29 is a transverse sectional view taken along line 29—29 of FIG. 28 illustrating the completed strain gage of FIG. 28;

FIGS. 30–33 are elevational views illustrating steps in the manufacture of another form of strain gage embodying the basic principles of my invention;

FIG. 34 is a transverse sectional view taken along line 34—34 of FIG. 33;

FIG. 34a is a transverse sectional view of a highly simplified ambient temperature type of strain gage constructed in accordance with the principles of my invention;

FIGS. 35–37 are views, partly in top plan and partly in horizontal section, illustrating combination strain-temperature transducers in accordance with the invention;

FIG. 38 is a transverse sectional view taken along line 38—38 of FIG. 37;

FIG. 39 is an elevational view of an electroplating jig, and illustrating a relatively simplified method for mass-producing resistance filament-lead wire units useful in the strain gages of the invention, and FIG. 40 is a transverse sectional view, similar to FIG. 19, illustrating a strain gage employing a bimetallic housing to compensate for the effects of temperature changes.

A basic embodiment of my invention, providing a strain gage which is weldably attachable to the test specimen along the entire effective length of the strain-responsive filament contained within the gage, is illustrated in FIG. 1. Here, the gage comprises a fine strain-responsive resistance wire or filament 15 coaxially disposed in an elongated tube or similar external housing 16 with the ends of the filament wire terminating within the tube. A pair of larger lead wires 17 and 18 are welded, soldered or otherwise attached to the ends of wire 15, or lead wires 17 and 18 may be formed integral with wire 15 in a manner hereinafter described, and extend coaxially beyond the respective ends of housing 16. The free ends of the lead wires are adapted to be connected to a conventional bridge circuit or other measuring network. A suitable compactable or compressible mass of solid insulating material 19 such as powdered mica, aluminum oxide, thorium oxide, magnesium oxide, magnesium silicate, forsterite $$(2MgO \cdot SiO_2)$$

or any of the insulating plastics which are substantially stable at relatively high tempertaures, such, for example, as polymerized tetra-fluoro-ethylene, is disposed within housing 16 surrounding the fine wire or filament 15. I have found that magnesium silicate ground to a fine powder and fired at approximately 1900° F. for one hour provides an excellent material for use in the gages of the invention. Two or more insulating materials of different coefficients of expansion may be combined in proper proportions to give a desired coefficient of expansion approximating that of the material forming external housing 16. A plurality of insulating washers 20 may be disposed over the lead wires at each end of the housing to retain the insulating material within the housing.

According to the embodiment of the invention illustrated in FIG. 1, after the insulating material has been placed around the filament section 15 and around at least a portion of the lead wire extensions 17, 18 as tightly as possible, and the insulating washers 20 are placed in position at the open ends of housing 16, the housing 16 is drawn down from its original diameter to a smaller diameter in order to compress the insulating material 19, thereby exerting mechanical pressure on the washers, the insulating material and the resistance wire embedded therein. This causes the resistance element 15 to be clamped over its entire length and surface by the radial force or pressure of the compressed insulating material surrounding it. The insulation is in turn firmly coupled to the inside surface of housing 16 by the compressive force exerted against the housing by the insulating material such that any movement of the housing is transmitted through the compact mass of insulating material to the resistance element 15. Resistance element 15, on the other hand, is thermally and electrically insulated from the external housing. Thus, if the housing is welded to test specimen 21 by small spot-welds (designated by x's in FIG. 1) or a continuous weld along the entire length thereof or any shorter length corresponding to the total length of filament 15 contained therein, and a strain is then introduced into the test specimen causing its dimensions to change, the dimensions of housing 16 will also change and this change or deformation will be transmitted through the compressed insulation to the wire resistance element causing a proportionate change in the resistance of this element.

FIG. 4 illustrates a modified form of gage housing which is intended to facilitate mounting of the gage to a test specimen, wherein the external housing consists of an elongated tubular envelope 23, the upper portion of which is substantially circular. The lower portion of housing 23 is provided with similar flanges 23A and 23B formed integrally on each side of the tube and extending transversely to the axis of the tube. In this arrangement, the resistance element 15, insulating material 19, and insulating retainer washers (not shown) are disposed in the housing as in the embodiment of FIG. 1 and the housing is then crimped or run through a suitable die which gives it the cross-section illustrated in FIG. 4, and also causes the insulating material to be compressed against the resistance element in the same manner as effected by the drawing operation described in connection with the embodiment of FIG. 1. The flanges 23A and 23B are intended to facilitate attachment of the gage to a test specimen by welding. Thus, the two flanges are welded directly to the surface of the test specimen by suitably spaced spot-welds or single continuous linear welds extending along the entire effective length of the gage, i.e., the length of the resistance filament, plus any excess deemed necessary or desirable. In a similar manner, FIG. 5 illustrates a modified cross-sectional configuration wherein two separate sections 24 and 25, each provided with laterally projecting flanges, are welded together or otherwise fastened at the flanged portions so that the resistance element and insulating material are tightly compacted within the housing. Here again, the gage structure can be mounted on a test specimen by welding directly through the flange portions.

FIG. 6 illustrates another embodiment of external gage housing in which the housing 26 is formed with a corrugated or bellows-like surface to facilitate its deformation, and to reduce the amount of structural strength it will add when attached to a test specimen.

FIG. 7 illustrates a still further embodiment of the invention in which the external housing 27 is provided with sharply-indented grooves or slits 28 to facilitate its deformation and to reduce its contribution to the strength of the test specimen when the housing is attached to the specimen.

FIGS. 8 through 10 illustrate an embodiment of the invention in which the external housing 29 comprises a rectangular-shaped body 30 having an elongated rectangular groove 31 in its surface. A resistance element 32 comprising two relatively heavy electric leads 33, 34 with a fine gage wire 35 bonded between the lead wires is disposed within the groove. Each of the lead wires rests on sheets 36, 37 of suitable insulating material, such as mica. Additional sheets 38, 39 of insulating material are placed on top of each of the lead wires. A pair of small rectangular blocks 40, 41 are disposed over the stacks of sheet mica, respectively. These blocks are forced down on the mica sheets by any suitable means such as hammering and are held in position by deformation of the upper edge of the groove adjacent the upper surface of the blocks, as indicated at 42 by the dotted lines in FIG. 9. A powdered insulating material 43, such as mica, is placed in the groove between the two sheet stacks and tamped firmly into the groove. A bar 44 adapted to fit in the groove is disposed over the powdered mica and is hammered and clamped in position in the manner described for the two small blocks. The dotted lines at 45 of FIG. 10 illustrate how the bar is held in position. With this arrangement the fine wire is firmly clamped in the powdered mica so that the wire resistance will respond to deformation of the body.

In the embodiment shown in FIGS. 8 though 10 the body can either be the test specimen proper or it can form a suitable housing which is adapted to be bonded to a test specimen. In general, this type of structure finds particular application in permanent installations, wherein a continuous strain measurement or similar physical measurement is required during routine operation of the equipment forming the test specimen, such as for cranes, lifts, etc.

In FIG. 11 curve 46 illustrates the performance characteristics at 1020° F. for the gage structure illustrated in FIGS. 8 through 10, with the strain wire mounted directly in a steel test specimen.

The strain wire used was a .001 in. diameter platinum wire welded between two leads of .010 in. diameter copper wire. The surrounding insulating material was powdered mica. The curve of FIG. 11 shows the conventional plot of stress (p.s.i. $\times 10^3$) vs. the ratio of change in resistance to total resistance (ohms/ohm $\times 10^{-4}$).

The values to the left of the abscissa are those obtained when the strain wire was subjected to forces of compression and the values to the right are for forces of tension. These results demonstrate that the arrangement is equally satisfactory for measuring compressive stresses, as well as for measuring tension stresses, even though no prestress is applied to the resistance wire in assembling it in the external housing. These results also demonstrate that the basic structural characteristics of the gages are admirably suited to high temperature operations.

As pointed out hereinbefore, the housings of the strain gages of the invention are preferably formed of a material which is readily adaptable to bonding by electric resistance welding or sonic welding. On the other hand, it is equally important to successful operation of the gages that the housing be of minimum structural strength so as to reduce its effect on the normal strain characteristics of the test specimen, and to permit it to be deformed readily under stresses occurring within the test specimen. I have found that housings formed of thin sheet steel are admirably suited for use in the manufacture of weldable strain gages according to my invention and that such housings may be formed in a variety of configurations to facilitate attachment of the gages to a test specimen by welding while at the same time permitting the housings to be formed of minimum structural strength. In adapting the basic structural characteristics of my gages to conventional welding practices, it is important that the gage housing be such that it will permit positioning of the welding electrodes as close as possible to the actual point or points of weld, thereby to insure the shortest possible path for the welding current and substantially localized heating only, of the gage structure.

For example, with reference to FIG. 12 of the drawings, there is shown in cross-section, the basic gage configuration of FIG. 2 positioned for attachment by welding to a test specimen 47. Current from the welding electrode 48 will flow within the tubular housing 16, as indicated by the small arrows in FIG. 12, entering the test specimen at the weld-point, as indicated by reference numeral 49. Although I have found from practical experience that it is entirely possible to spot-weld a gage of plain tubular configuration in the manner illustrated, and to obtain accurate test results with gages mounted in this manner, I have also found that since the welding electrode 48 must be positioned relatively remote from weld-point 49 in this type of welding operation, unless one employs a special electrode that is adapted to fit around the tubular housing of the gage there is some danger of damaging the gage through overheating of the tubular walls. Furthermore, it is difficult in this type of welding operation to obtain a high concentration of force at the welding point because of the possibility of crushing the relatively thin tubular housing under the pressure required.

As explained hereinbefore, in the gage structures illustrated in FIGS. 4 and 5, provision is made for attachment of the gage by welding or spot-welding to a test specimen by means of the flanges 23A and 23B formed integrally on each side of the lower portion of the housing 23. With this type of gage housing, the welding electrode can be positioned directly over the respective flanges without excessive heating of the remaining portions of the gage housing and without danger of crushing the central section of the gage housing containing the resistance element. It sometimes occurs with this type of structure (FIG. 4), however, that in the die operation or crimping operation employed to compress the insulation about the gage wire or wires and for forming flanges 23A and 23B, a portion of the insulation may be compressed between the flange walls, thereby forming a relatively high resistance path for welding current passing through the flanges to the test specimen.

In FIG. 13 of the drawings, I have shown in cross-section, a type of gage housing which I find to be particularly well suited for attachment to a test specimen by spot-welding or welding over the entire length of the gage. The gage housing is formed in the same general configuration as that shown in FIG. 5, but is provided with elongated side flanges 50 which are adapted to be bent downward into contact with the test specimen, as indicated by reference numeral 47 in FIG. 13. In this manner, the welding electrode 48 can be positioned directly over the flanges and current from the electrode, as indicated by the arrows in FIG. 13, need only travel a few thousandths of an inch through an all metallic path to the weld-points 49, thereby insuring substantially localized high temperature heating of the gage and permitting the application of high pressures to the weld-points without danger of damaging the central portion of the gage housing.

In FIG. 14 of the drawings, I have illustrated in cross-section the preferred form of weldable gage embodying the basic principles explained above. The gage is shown in position with the right-hand side attached to a test specimen 47. FIGS. 15, 16 and 17 illustrate a preferred method of assembling the gage of FIG. 14, whereby I am able to attain a high degree of compression of insulating material within the gage while at the same time introducing tension into the gage housing.

With reference to FIG. 14, the gage comprises two semi-tubular sections 51 and 52; an upper section 51 defining substantially the entire housing for the resistance wire and insulating material, and a lower section 52 joined to the upper section by means of flanges 53 to complete the gage cavity. Flanges 53 are positioned well below the horizontal center line of the gage and are adapted to be forced downward against the test specimen during the mounting operation. The weld-points 49 joining the gage to the test specimen, as shown with reference to the mounted or right-hand side of the gage in FIG. 14, are formed through flanges 53 as close as possible to the vertical center line of the gage, thereby insuring firm contact of the gage with the surface of the test specimen.

In assembling the gage of FIG. 14, the upper tubular section 51 is mounted upside-down in a mating welding jig 54, as shown in FIG. 15, and the resistance wire or wires 15 and insulating material 19 are then positioned within section 51, the latter material in an amount sufficient to insure good compressive contact with wire 15 as well as the inner walls of the housing when assembled. Although not shown in the drawings, the gage housing is, of course, terminated or closed with insulating washers as for the arrangement previously described in connection with FIG. 1.

The lower section 52 is then placed in position over upper section 51 within the welding jig 54, as best seen by reference to FIG. 16, and the flanges 53 of section 52 are welded to the similar flanges 53 of section 51 at their ends as indicated by the positioning of electrode 48 in FIG. 16 and weld-points 49 beneath the electrode. Pressure is then applied to lower section 52 immediately adjacent the inner ends of flanges 53, forcing the flanges of each section together as shown in FIG. 17, and the flanges are welded in this position as illustrated by weld-points 49 in FIG. 17 to provide a final structure similar to that shown in FIG. 5. In this manner, the insulating material 19 is compressed and forced into intimate contact with resistance wire 15 and with the inner walls of the gage housing, thereby insuring good sensitivity for the gage. In addition, as an added advantage of this method of assembly, a tension stress is introduced into bottom section 52 of the housing between the inner weld-points 49 or that portion of the gage housing between the flanges which is mounted in contact with the test specimen as shown in FIG. 14.

Of course, a great many other variations in the basic design of the strain gage housing may be effected to facilitate weldable mounting of the gage for general use or for specific applications involving test specimens of irregular surface contours, etc. For example, the basic gage housing, as shown in FIG. 2, may be modified simply by the addition thereto during manufacture, of a thin, flat strip welded to the tubular housing at the bottom and extending beyond the sides thereof to provide flat welding surfaces permitting attachment of the gage to a test specimen without the use of special electrodes (for general cross-section see FIG. 34). In addition, the flanges or weldable mounting surfaces of the gage housing may be perforated or slotted during manufacture to permit riveting of the gage to a test specimen or improved bonding when mounted by welding or soldering. The housing may also be formed of a single piece of sheet steel or other suitable material by folding to form one flange and a central housing and then welding the free ends together to form the other flange, or, the housing may be formed of a single piece with but one flange suitable for attachment by welding to a test specimen. Furthermore, the central section of the housing containing the resistance wire and insulating material may be pressed into any desired configuration or creased or crimped at one or more points to provide increased compressive contact following assembly of the gage.

For certain applications, it is desirable to terminate the gage lead-in wires at one end of the gage housing and in FIGS. 18 and 19 I have shown in sectional-plan and cross-sectional views, respectively, a gage of this type. With reference to FIGS. 18 and 19, the gage comprises a substantially flat bottom section 55 and a semi-tubular upper section 56 defining substantially the entire housing for the resistance wire 15 and insulating material 19. The upper section 56 is closed on three sides and is provided with flange sections 57 which are welded or otherwise attached on three sides to the bottom section 55. The gage is formed in exactly the same manner as the embodiment of FIG. 14 previously explained with reference to FIGS. 15, 16 and 17. The resistance wire 15 is looped within the housing as shown in FIG. 18 and is joined to the separate lead-in wires 17 and 18 within the housing, and these leads are then extended externally of the housing at the single open end through suitable insulating washers or retainers 20. The upper section 56 of the gage housing may be dished to a greater depth over the portion housing the lead-in wires, as indicated by reference numeral 58 in FIG. 18, to accommodate these wires.

It is further desirable for certain specific applications to provide a plurality of resistance elements or filaments within a single gage housing. In the gage illustrated in FIG. 14, I have shown the simplest form of multi-filament gage wherein two separate resistance wires are carried within the same housing in parallel relationship and simply insulated from each other by spacing them apart a suitable distance within the mass of insulating material. This same general type of structure could also be employed to provide multi-conductor electrical leads of any desired length for use in high-temperature electrical wiring installations, such, for example, as lead wires in a thermocouple installation, etc. For certain applications, such as high temperature underwater installations or where the gage is placed within a concrete structure, it is desirable to provide one continuous outer shell housing the gage assembly and long leads (up to 50 feet or more) in which the effective gage section is indicated by suitable external markings or appropriate deformation of the housing over the filament length.

In FIG. 20 there is shown another type of multi-filament gage which includes a complete four element bridge circuit contained within a single housing 59. The unit comprises two separate resistance elements 60 and 61 positioned within housing 59 in the same manner as the dual resistance wires in the gage of FIG. 14, the ends thereof being connected to the respective lead-in wires 62, 63, 64 and 65. Resistance elements 60 and 61 constitute the active or functional members of the strain gage, i.e., those members which are subject to deformation by reason of pressure coupling to the external housing through the compressed insulating material 19. At the junctions of the ends of filaments 60 and 61 with their respective lead-wires, I provide two dummy or non-strain-responsive resistance elements 66 and 67, electrically connected across wires 60 and 61 but otherwise insulated from these wires by spacing within insulation 19, or any other suitable means. The gage housing is closed at its ends by means of insulated washers 68, two of which are shown in position in the fragmentary view of FIG. 20. The gage housing is formed with enlarged end portions 69 to accommodate coupling of resistance wires 60 and 61 to the respective lead-wires and to provide a suitable housing for dummy elements 66 and 67. The housing 59 preferably is formed of a substantially semi-tubular upper section and a flat bottom section which are welded together in the same manner as the gage previously described in connection with FIGS. 18 and 19. In addition, the gage housing is provided with flanged sections 70 to facilitate assembly and for ease in mounting by welding to a test specimen. Thus, in cross-section through one of the enlarged end portions 69, the gage of FIG. 20 is substantially the same as shown in FIG. 19, but containing, of course, the dummy coils 66 and 67.

It should be readily apparent that resistance elements 60, 61, 66 and 67 can be formed of one continuous loop of wire simply by joining a straight length at one point. In this manner, no lead wire connections and hence no thermocouple action would exist within the bridge circuit. This type of gage is, of course, simpler and faster to install than four independent gages and also provides more perfect temperature compensation as well as fewer external wiring connections. The same circuit arrangement can be mounted within the single open end type of gage housing illustrated in FIGS. 18 and 19 or any other combination of dummy and active resistance elements can be interconnected to provide modified circuit arrangements for specific measuring requirements.

Such a gage is shown in FIG. 21 and also serves to illustrate the use of long lead-out wires with a housing which is integral with the housing for the sensing elements. The long lead out wires 71–74 terminating in a male pulg 75 or convenient connection system is shown in FIG. 21. The unit comprises two separate strain responsive elements 60 and 61 positioned within a single housing 76 in the same manner as the filament 15 in the gage shown in FIG. 18 and insulated from one another by spacing within insulation 19, or any other suitable means. Two dummy or non-strain responsive resistance elements 66 and 67 are connected between different ends of wires 60 and 61 and are otherwise insulated from wires 60 and 61 by spacing within insulation 19. Wires 71 and 72 are continuations of the ends of wire 60 while wires 73 and 74 are continuations of the wire 61. The plug 75 is substantially like the end of the gage shown in FIG. 18. The housing 76 perferably is formed in the same manner as the gage previously described in connection with FIGS. 18 and 19.

For other measuring techniques, it is more desirable to use a plurality of independent gages which may be pre-assembled in clusters of a predetermined configuration, i.e., rosettes, shear gages, complete four gage bridges, etc., with desired angles, and spacings between respective gages. In FIG. 22, I have illustrated a pre-assembled 120° rosette cluster, in which three independent gages 77–79, of the type illustrated in FIGS. 18 and 19, are mounted by welding as for a conventional installation to a thin metal sheet 80 which is in turn adapted to be mounted by welding to a test specimen. The backing sheet 80 can be provided with markings to facilitate installation of the rosette in correct position and to indicate the line of weld best suited to proper functioning of the gage unit when ultimately installed on a test specimen.

The embodiments of the invention described hereinbefore, while attachable to different test surfaces by various types of welding, including sonic welding, are especially advantageous for use in installations in which conventional electrical resistance welding methods are to be employed. However, gages constructed in accordance with further embodiments of the invention are particularly suited for installation by sonic welding methods as described below.

One such embodiment is the foil-backed strain gage illustrated in FIG. 23. Here, the grid 81 of the gage is in the form of a flat, very thin, etched foil of a material of high specific resistance. The grid is cemented to a sheet of rice paper or other insulated material 82 which extends beyond the outer periphery of the grid. Sheet 82 is in turn cemented to a thin metal foil backing 83 which is of the same shape, but larger than, sheet 82 so as to provide a peripheral flanger or border 84. Alternatively, grid 81 can be encased in a high temperature cement of good electrical insulating characteristics, the encased grid then being secured to the backing foil.

It might appear that the gage structure of FIG. 23 could be welded to a test piece by applying conventional resistance welds around the exposed border 84 of backing foil 83, as indicated by the x-mark in FIG. 23. Such a method of attachment is found to be entirely unsatisfactory, however, because it leaves the central or critical portion of the strain-sensing foil 83 unsecured to the test specimen, with the result that the gage simply buckles when subjected to a compressive force in its long dimensions. On the other hand, it is impossible to effect resistance welding of the gage at any point within the area containing the insulating medium 82. I have found, however, that it is entirely possible to effect sonic welding within the central area of the foil 83, despite the presence of insulation at these points, thereby effecting intimate coupling of the strain-sensitive foil to the test specimen throughout its effective length, as indicated by the circle-marks in FIG. 23.

The foregoing techniques finds particular application in the installation of gages on aluminum bodies such as in the aircraft industry. In a typical installation, an aluminum foil backing strip of approximately 0.0003 inch thickness, carrying an etched foil filament which is separated from the backing strip by means of a thin piece of rice paper, can be effectively bonded to an aluminum test specimen by ultrasonic welding using a 100 watt ultrasonic generator operating at 20,000 cycles. The high-frequency sound waves penetrate the intermediate layer of rice paper effecting a molecular transference or plastic flow between the foil backing and aluminum surface producing a weld of unusual strength.

I have also found it to be entirely possible to effect a good strain-responsive coupling of this type of gage by use of conventional electric-resistance welding with a special type of electrode. The method is illustrated in FIG. 24 which shows a foil-backed gage similar to that illustrated in FIG. 23, and a flat welding electrode 85 which has a shape which conforms generally to the gage being secured, thereby enabling the electrode to be slipped a short distance under the border 84 of the foil backing 83 on three sides. The outer edge of the backing foil 83 is held in contact with the electrode 85 to establish a good electrical connection by any suitable means such as a plurality of piercing pins carried on the electrode. The portion of electrode 85 adjacent the test specimen 47 is insulated by a suitable coating (not shown) since the test specimen is ordinarily connected to one side of the welding current supply unit (not shown). A probe 86 is used to apply pressure to the insulation 82 and thus hold the metallic backing 83 in close contact with the test specimen at points intimately adjacent the strain-sensitive filament. Welding current flows from at least three sides of the gage and then to the test specimen 47 at the point where the probe 86 is applied, thereby securing the central portion of the foil-back gage to the test specimen. More than one probe 86 can be used to secure the central portion at more than one point at a time, or a single probe can be moved successively to a plurality of points. Alternatively, by forming a number of small projections or nipples (not shown) on the central portion of the foil backing adjacent the filament and applying pressure over a general area of the foil backing while feeding welding current to the electrode 85, I am able to secure the central portion of the foil backing 83 to the test specimen simultaneously in a number of places corresponding to the nipples, due to the relatively greater contact of these points against the surface of the test specimen.

I have also devised a form of foil-backed gage which is readily attachable to a test specimen either by normal electrical resistance welding or ultrasonic welding. One embodiment of this gage is shown in FIGS. 25 and 26, where the grid 81 and foil backing 83 are similar to those previously described in connection FIG. 23. A foil consisting of two sections 87–88 is secured to the foil backing 83, as by welding, to form a channel 89 which is shaped like the strain-responsive grid 81. Grid 81 is disposed within the channel 89 and is surrounded with insulation 90 to insulate the grid from the foil backing and from the foil section 87–88. The foil sections 87–88 are thicker than the foil backing 83. The outer periphery of the sections 87–88 do not extend to the outer periphery of foil 83 so that a border 91 is provided around the sections 87–88. FIG. 26 shows the gage with a top foil 92 similar to foil backing 83. The gage just described can be readily secured by resistance welding, the welding electrode 93 being applied anywhere on the foil sections 87–88 as well as along the border 89 to weld the gage to the test specimen 47.

In FIG. 27, I have shown a form of gage housing which is ideally suited for use for strain measurement work performed under conditions of extreme moisture or under corrosive conditions, as, for example, those encountered in underwater measurements or measurements within concrete structures wherein the gage must be positioned for use before the wet concrete is cast or permitted to set. With reference to FIG. 27, there is shown one end only of a gage similar to the basic gage of FIG. 1, wherein the insulating retainer washers 20 are replaced with a hermetical seal 94, formed by fusing a sealing bead or washer of glass or similar material to the external housing 16 and lead wire 17. The hermetical seal 94 can be fused in place preliminarily to compressing the insulating material 19, after which the housing 16 can be deformed over that portion of its length enclosing resistance element 15 to provide the necessary pressure bonding of the insulating material 19 to resistance element 15 and housing 16, or, alternatively the seal can be formed after the gage has been deformed to compress the insulation. The housing can be evacuated before sealing or an inert gas inserted under pressure if necessary or desirable. The hermetical seal effectively solves the more troublesome problems of moisture and corrosion and renders the gage, with proper long lead wires of the covered type hereinbefore described, usable under water with complete safety and usable in concrete where moisture conditions are also a serious problem.

In adapting my basic gage for use in strain measurements within concrete structures, I prefer to provide external housing 16 with a plurality of fins or projections, as indicated by reference numeral 16$^a$ in FIG. 27, to interlock with the concrete thereby insuring a better bond between the gage and structure under analysis. Any similar irregular surface provided on housing 16 will accomplish the desired result.

In lieu of the compressible powdered insulation, or in addition thereto, I have found it to be possible to form insulated filaments by simply enamel-coating the otherwise bare wire, or by coating the same with a layer of oxide deposited on the wire cataphoretically or by the conventional drag or spray methods used by vacuum tube manufacturers in coating heater elements for use in vacuum tubes. The insulated wire is then placed in any suitable external metal housing such as those described earlier, with or without additional insulation of the powdered type. The use of a coated wire 15$^a$ (FIGS. 28–29) facilitates handling, reduces assembly cost, provides a gage of better quality and simplifies the fabrication of more complicated gages. It is also possible to electro-coat or deposit a metal shell over an oxide-coated filament of the foregoing type to provide a complete gage structure for direct use as such, or for mounting within the normal external housing as a pre-assembly expedient.

Deposition of a metal shell over the filament-insulation unit is accomplished in the same manner as deposition of the insulation, or the deposited insulation can be pre-coated with graphite and the metal shell then electroplated over the graphite. Alternatively, the graphite-coated assembly can be set up as the dissociation-deposition surface in a standard van Arkel-de Boer bulb with the metal coating deposited by dissociation of a metal halide in contact with the assembly while maintained at an elevated temperature by the passage of electric current through the filament.

FIGS. 28 and 29 illustrate another embodiment of the invention in which an insulation-coated filament wire 15ª can be used advantageously. The precoated element 15ª is laid lengthwise on top of a rectangular piece of thin metal foil 95 with uncoated ends 96-97 of the filament extending beyond the foil. The element 15ª is provided with two small beads 98-99 of insulation which are positioned along the wire so that they are adjacent the ends of the foil 95. A piece of metal foil 100, similar in size and shape to the lower foil 95, is placed on top of the element 15ª and in registry with foil 95. The two foils 95 and 100 are joined together by welding along each side of the wire 15ª. Thus, a split shell tube type of construction is formed with the insulation firmly clamped to the wire element and the external housing.

A still further embodiment of the invention in which a precoated wire may be used to advantage is shown in FIGS. 30 through 34. The gage wire 15 formed as one piece with large end portions or leads 101-102 is first coated with insulation 19 by any of the aforementioned methods; the insulation extending over the thin portion of the wire and partially onto the enlarged end portions as shown in FIG. 31. A layer of metal 103, such as nickel, is deposited over the insulation except for a small amount of the insulation at each end as shown in FIG. 32. The precoated element is then placed in a metal tube 104 which is slightly shorter than the length of the metal layer 103. The central portion of the tube 104 is then swaged so that it is made smaller than its original diameter. This serves to powder the insulation in the central portion and so frictionally couples the wire 15, the insulation 19, the metal layer 103 and the tube 104 into a unit strain-responsive assembly. The tube 104 is then provided with an elongated metal flange 105 secured to it, as by welding, which serves as a means for securing the gage to a test specimen (FIG. 34).

The principal advantages of the frictionally-coupled gages of the present invention are their weldability, which provides for ease in mounting on a test specimen, and the fact that they may be employed equally well in high temperatures or ordinary measurement work without fear of affecting the pressure coupling between filament and external housing. In situations wherein temperature is not an important consideration, that is, for strain measurement work performed at ambient temperatures, a considerable saving in manufacturing cost may be effected without loss of the desirable weldability characteristic of the gages, by eliminating the pressure coupling entirely. This may be accomplished by employing a bonding insulation capable of providing simply electrical insulation between the housing and filament and further capable of binding the filament to the external housing by adhesive force. Any of the many commercially available insulating glues or cements may be used to provide this type of insulation bonding, such, for example, as Carbo-Insulate (Tradename), Ducco (Tradename), cellulose acetate or nitrate lacquers, or any of these substances in admixture with a suitable insulating filler material. The cement or glue is placed within the tubular external housing surrounding the resistance wire or wires in the same manner as the high temperature insulating material 19, and in quantity sufficient to fill the entire space between the resistance wire and the interior wall of the external housing. The bonding insulation is then permitted to set or dry with the result that the filament will be adhesively bonded to the external housing and electrically insulated therefrom by the insulating qualities of the bonding insulation. With the flanged type of external housing such as illustrated in FIGS. 13, 14, 18 and 20 of the drawings, a gage utilizing a bonding insulation may be attached to a test specimen by welding along its entire length without adversely affecting the bond between the resistance element and housing, since the welding current will not result in overall general heating of the gage structure.

As an alternate arrangement of a gage that may be employed at ambient temperatures, a combination of pressure coupling and adhesive bonding may be used to increase the effective coupling between housing and filament. For example, again with reference to the form of external housing illustrated in FIG. 14, the resistance wire or wires as well as the inside surfaces of lower section 51 and upper section 52 of the housing may be coated with an adherent or cement just prior to the assembly operation with the result that the solid insulating material 19 will be bonded to the resistance element and external housing by the combined action of pressure coupling and an adhesive bond, or, the high temperature type of insulating material 19 may be omitted entirely and a bonding insulation of the type previously described may be substituted in the housing surrounding the resistance element and may be compressed in the same manner as the high temperature insulating material to produce combined pressure coupling and bonded coupling of the resistance wire to the external housing. Again, the resulting structures may be mounted to test specimens by welding since the localized heating produced by the welding current in the mounting flanges will not affect the bonded insulation, nor any adherent used in conjunction with the conventional high temperature insulating material. The same procedures may be employed in assembling for ambient temperature measurement work, the single open-end type of gage as illustrated in FIGS. 18 and 19, the multi-filament type of gage as illustrated in FIG. 20, the hermetically sealed gage of FIG. 27 or any of the other many possible gage configurations formed in accordance with the teachings of the present invention.

I have found that a very effective low temperature, weldable gage may be formed by utilizing simply the upper tubular section 51 of the gage illustrated in FIG. 14, without the bottom section 52 attached thereto, and by substituting bonding insulation for the high temperature powdered insulating material 19. The resulting gage is placed on the test specimen in the same manner as shown in FIG. 14 but with the exposed bonded insulation formed level with the bottom of the housing and placed in direct contact with the surface of the test specimen. The gage may then be welded to the test specimen along the entire length of flanges 53 without adversely affecting the adhesive bond between the resistance element and insulating material or the housing and insulating material. In the same manner, the upper section 56 of the single open-ended gage shown in FIGS. 18 and 19, may be used with a bonding insulating material to provide an open-faced, weldable gage, wherein the gage is adapted to be attached to a test specimen by welding with the exposed bonded insulating material in direct contact with the test specimen along the entire length of the resistance element. The method of attachment may be best understood by assuming that bottom piece 55 of the closed housing, shown in cross-section in FIG. 19, corresponds to the surface of a test specimen. The resistance wire or wires may be positioned within the bonded insulation closely adjacent the open face of these gages to provide increased sensitivity, and, actually, need only be insulated from the surface of the test specimen by a very thin layer of the bonded insulation. In their adaptability to attachment by welding, these low temperature strain gages overcome one of the principal disadvantages of prior bonded type gages, in that they may be used immediately after mounting and without need to await setting of a bonding substance. Furthermore, they are capable of measuring both tension and compression without pre-stressing of the filament wire and are, therefore a decided improvement over the conventional unbonded type of gage known to industry.

As explained hereinbefore, conventional low temperature, open-faced or so-called "bonded" strain gages utilize a resistance element which is bonded by an adherent to a thin piece or pieces of paper or similar electrical insulating material, which is in turn adapted to be bonded by cementing to a test specimen. It is also known to mount the resistance element on a paper carrier and in insulated contact with a sheet of tin foil, at least a portion of which is cemented to the test specimen in the same manner as the paper carrier in order to increase the dissipation of heat due to $I^2R$ effects in the resistance element. All such prior structures are designed on the apparent belief that in order for the gage to function properly the carrier material disposed between the resistance element and test specimen must be of the very minimum possible structural strength, i.e., paper etc. Accordingly, the only practical method for mounting gages of this type has been by means of an adherent which will not damage or destroy the carrier material. My experiences have demonstrated that the use of a housing or carrier of weldable metal does not introduce any appreciable restraint nor does it otherwise affect the natural strength of the test structure to any significant degree. In fact, I have found it to be practical in accordance with my invention to form and use tubular gages or weldable open-faced gages so small that they offer no more restraint than conventional types of bonded gages. I have further found that mounting or attachment of my gages by welding to a test specimen does not alter the structural characteristics of the test specimen to any detectable amount. Actually, the effects of the tiny spot welding beads apparently alter the natural characteristics of the specimen less than the installation procedures employed in mounting a conventional bonded gage. This conclusion is based on the fact that in the installation of a cement bonded gage, the surface of the test specimen must be sanded or otherwise roughened, whereas my weldable gages can be installed on any clean surface, even a polished surface, without altering the natural surface contours of the specimen. The welds, per se, apparently do not penetrate the test specimen any deeper than the scratches required for cemented installation of conventional bonded gages. In addition, I have demonstrated that it is entirely possible and practical to spot-weld the very tiny gage structures of my invention to a test specimen along their entire length, without adversely affecting either the low temperature or high temperature type of gage structure, and thereby to promote initimate, rigid coupling of the gages to the test specimen.

In line with the foregoing explanation, in FIG. 34a of of the drawings, I have illustrated, in cross-section, an extremely simple and inexpensive form of open-faced weldable gage intended for use for ambient temperature strain measurement work. The gage comprises a thin weldable metallic base member 106 on which I mount the fine resistance wire or wires 15 and associated lead wires, within a mound of insulating cement 107 extending along the entire length of the resistance wire and a portion of the lead-wire segment at each end thereof. The cement serves to bond the resistance wire to base member 106 and also provides electrical insulation between the wire and base. After the cement is cured, the entire unit may be welded to a test specimen by spot welding along the outer edges of base member 106 as indicated by weld points 49 in FIG. 34a. If desired, and, in order to facilitate deposition and retention of the insulating cement and resistance wire prior to curing, base member 106 may be provided with vertical side members defining a central trough to receive the resistance wire and insulating cement.

In test applications wherein there may occur the possibility of error caused by thermal effects on the resistance element, a second gage may be mounted on the test specimen closely adjacent the principal gage so that both units are subjected to the same temperature effects. The second or dummy gage if bonded to the test specimen at but one point will respond only to temperature effects and the output of this gage may then be used to correct the output of the first or principal gage for error due to thermal effects. I find that the type of gage illustrated in FIGS. 18 and 19, i.e., with both leads terminated at one end of the gage housing is not only more compact but also exhibits less difference in thermal conductivity between a dummy gage (welded at one point) and a principal gage (welded over its entire length) when mounted as a thermal-compensating pair in the manner explained above.

In such installations, and also in other types of high temperature strain gage installations, I find that it is often desirable to obtain a simultaneous measurement of both strain and temperature. To accomplish this, I provide a combination strain-temperature transducer embodied in a single housing and with the transducer being installed in a minimum amount of time and being of such nature that the temperature responsive means is subjected to the conditions existing precisely at the point of strain gage measurement. In the embodiment shown in FIG. 35, the transducer comprises a thermocouple 108 and a strain gage. The strain gage filament 15 is mounted at one end of the elongated housing in the same manner as indicated for the strain gage embodiment shown in FIG. 6 and has a cross-section of the type seen in FIG. 19. Thermocouple 108 is similarly mounted in the other end portion of the housing, longitudinally spaced plugs 20a, 20b serving to provide an insulation-free space 19a around thermocouple junction 109 to afford good heat transfer characteristics.

Another embodiment of the strain-temperature transducer is shown in FIG. 36. In this embodiment both ends of the housing are formed like the strain gage end in FIG. 35 except that the filament 15 constitutes the strain gage while the filament 110 is a temperature responsive element. Both are resistive elements and since the circuitry associated with the filaments determines to a large degree whether the system is temperature or strain sensitive, some transducers are constructed in which the filaments are identical, making it possible to use both for temperature measurement or both for strain measurements or one for each type of measurement.

A further embodiment of the strain-temperature transducer is shown in FIGS. 37, 38. In this embodiment, the thermo-couple 108 or thermistor 110, whichever is employed, is placed along side the strain gage in a single tube 111 or the side-by-side relationship is accomplished by placing the elements in separate tubes 111 with the tubes joined by a web 112 as shown in FIG. 37. The web 112 is actually a portion of the bottom flange 113 which is used to secure the transducer to the test specimen 47, as best seen in FIG. 38. The flange 113 is electric-resistance welded or sonic welded to the tubes 111.

As shown in FIGS. 1, 18 and 19, the resistance elements of my gages consist of a fine wire bonded, as by soldering or welding, between two larger electrical lead wires. The fine resistance element can also be formed from a single, larger wire, such, for example, as wire 22 shown in FIG. 3 of the drawings, by drawing the wire down to a smaller diameter intermediate its ends to increase the resistance of the central portion thereof which may then be arranged within housing 16 in the form of a grid by doubling it back in several loops to provide increased sensitivity or greater resistance where necessary.

I have found, however, that the production of an internal resistance element or filament for my gages by soldering or welding of separate lead wires to the fine wire 15, is a precise and tedious operation owing to the very small sized wires employed (0.001 inch and less). Furthermore, the resulting joints are a possible hindrance to trouble-free operation of the gages because of possible thermocouple action, failure, etc. On the other hand, in forming the filament from a single wire by drawing in the manner described above, it is difficult to control or regulate the ohmic resistance per unit length of wire without the exercise of precise measuring techniques.

I have found that a filament-lead wire unit of the general type illustrated in FIG. 3, in which the strain sensitive wire and lead wires are formed integrally, can be produced by electroplating a length of fine wire selected for the resistance element, to build up the portions on either side of the filament section thereby providing integral, enlarged lead wires. On an individual production basis, a wire selected to provide the desired diameter for the resistance element, can be masked by coating or by the use of a clamp or tube to block off a central portion of proper length for the resistance filament and the entire wire may then be placed in the plating solution until the unmasked end sections are built up to the desired lead-wire diameter by electroplating. Although the plating procedure is preferred, substantially the same result can be accomplished by etching away a larger wire to provide a reduced diameter filament section.

In FIG. 39 I have shown an arrangement whereby these unitary filament-lead type elements can be mass produced by electroplating. In the drawing there is illustrated an electro-plating jig or frame of rectangular form which is adapted to be placed in a suitable tank (not shown) containing an electroplating solution. The jig comprises a top cross-member 114 of metal such as bronze, and two side supports 115 and a bottom cross-member 116, all formed of insulating material, such as Micarta. A plurality of metallic pins 117 are provided in spaced relationship across top member 114 and similar pins 118 of insulating material are provided across bottom member 116. The fine resistance wire 119 to be used as the gage filament is wound tightly between pins 117 and 118 in looped fashion as shown in FIG. 39 and the ends anchored to the jig in any suitable manner. The jig is then placed in an electroplating bath to a controlled depth, as represented by the dotted horizontal line 120 in FIG. 39. The electroplating apparatus includes a conventional anode formed of the metal to be deposited connected to the plus side of a source of potential, the negative side of which can be connected to metallic cross member 14 of the electroplating jig.

Following the plating cycle, the jig is removed from the bath and the partially plated, partially unplated wire is removed from the jig and the lower plated loops are cut as indicated by dotted line 121 in FIG. 39. The resulting segments comprise a plurality of separate filament wires with plated lead-wires at each end thereof. The resulting relatively large lead-wire sections can be shortened, twisted, bent, etc., without fear of failure such as occurs in joined wires, and without affecting the basic characteristics of the resistance element since their resistance is quite small compared to that of the filament section. It should be readily apparent that the electroplated filament-lead wire assembly is usable in a great variety of other electrical devices besides strain gages. Thus, many electrical devices such as wire wound resistors, relay coils, etc., utilize a length of relatively small wire which forms the key electrical circuit of the device. In almost all items of this type, each end of the fine wire must be equipped with a short section of larger wire or lead connector and this is customarily done by brazing, welding or physically clamping the required large wire to the fine wire. Besides providing the ultimate in strength and dependability compared with a welded or otherwise jointed assembly, the electroplated assembly of my invention offers a tremendous reduction in manufacturing costs.

During the plating cycle the level of the electroplating solution can be automatically regulated by a simple float valve to keep it at a constant level or it may be varied to effect a gradually receding level thereby to produce tapered sections such as that illustrated by lead-end 22$^a$ of the filament illustrated in FIG. 3. By tapering the lead section of the wire in this manner, I can thereby increase the holding force of the filament when it is clamped in the external housing by the compressed insulating material. Alternatively, following the initial plating cycle to build up a suitable lead-wire diameter, by folding the lower plated loops of the wire upwards out of the bath but leaving a small segment of the plated lead section adjacent the filament section within the solution, I can further plate a short oversized anchoring section or lug such as that illustrated at 22$^b$ in FIG. 3, which also serves to increase the holding force of the compressed insulating material against the filament when the gage is assembled. Of course, the surface of the filament section as well as those portions of the lead wires contained within the gage housing can be roughened or coated with abrasive particles and the inside wall of the housing may be similarly treated to increase the frictional holding force of the insulating material within the assembled gage.

In a typical example of the foregoing electroplating technique, a 0.001 inch diameter "Evenohm" (trade name—approximately 80% nickel and 20% chrome) resistance wire was electroplated with approximately a 0.002 inch layer of nickel in a "Watts Bath" type of solution of the following composition:

| | |
|---|---|
| Hydrogen peroxide | 1 pt./1000 gal. |
| Nickel sulfate | 40 oz./gal. |
| Nickel chloride | 6 oz./gal. |
| Boric acid | 4 oz./gal. |

No brightening or hardening agents were included as these tend to impart brittleness. The temperature of the bath was maintained at 150° F.–160° F. and the pH (Electro) at 2–4. The current density was over 100 A.S.F. The parts were cleaned prior to electroplating according to standard procedures, i.e., dipped in alkaline solution, rinsed in water, dipped in acid solution and rinsed in water again. The plating cycle is completed in approximately 8–15 minutes. The resulting product consisted of an unplated (0.001 in. diameter) filament section approximately one inch in length, and two lead-wire ends of 0.005 inch diameter, each approximately one inch in length.

A more elaborate method and apparatus for producing the unitary type lead wire-filament assemblies have been described and claimed in my copending application Serial No. 669,144 which was filed on July 1, 1957, and now abandoned.

In a typical installation of the gages of the invention, in particular, a gage of the type illustrated in FIGS. 18 and 19, I employ a condenser discharge type of welder. Spot weld beads are formed between the flanges of the gage and the test specimen along both sides of the active section (filament) of the gage. The two rows of beads are formed as closely as possible to the center portion of the gage housing by shaping a No. 3 welding electrode to provide an end of approximately 0.020 x 0.050 inch, the long dimension of the electrode being located parallel to the axis of the gage. The weld beads may be formed approximately 0.030 inch apart along the entire active length of the gage. Of course, special welding electrodes such as a wheel or disk which rolls along the flange or both flanges of the gage and is adapted to fire the welding current according to its linear and/or rotary travel, through a commutation system, may be employed to facilitate the mounting operation. Electrodes of this type are described and claimed in my copending applications Serial Nos. 721,255 and 721,256 which were filed on March 13, 1958 and now Patent Nos. 2,918,564 and 2,945,939, respectively. Furthermore, it is entirely possible to mount any of the gages herein described through the use of a bonding cement as for conventional bonded gages, and mounting by welding is not essential to the successful operation of the gages. In fact, when the gages are mounted by means of a cement bond, unlike conventional bonded gages which are destroyed upon removal, the gages of the present invention may be reused a number of times.

It is difficult to accurately depict the gage structures of the invention simply by reference to the drawings because of their extreme smallness, and, accordingly, it is believed that a dimensional breakdown will facilitate a complete understanding of the invention. Roughly, the gages measure up to two (2) inches in length, the outside diameter of the gage housing being approximately 0.020 inch, and the overall width of the gage housing including attachment flanges measures approximately one-eighth of an inch. The following additional dimensional data will further facilitate an understanding of the invention:

| | |
|---|---|
| Fine Resistance Wire | 0.005 to 0.002 inch. |
| Lead Wires | 0.003 to 0.010 inch. |
| Housing Diameter (O.D.) | 0.015 to 0.020 inch (up to 0.050 inch where lead wire ends enlarged). |
| Housing Thickness | 0.001 to 0.002 inch. |
| Flange Width | 0.020 to 0.030 inch. |
| Flange Thickness | 0.002 to 0.004 inch. |
| Length of Gage | ¾ to 2 inches (extendable to 50 feet or more for special applications). |
| Weld-bond | continuous linear weld or spot-welds spaced to provide about 40 per inch. |

The high temperature type gages of the invention have been operated with satisfactory performance at temperatures within the range of 1800° to 2000° F.

It is interesting to note that the gages herein described render it possible to compensate for temperature sensitivity which is a problem common to all types of gages. Thus, if four gages with identical temperature characteristics are mounted on a specimen and wired as a complete four-arm bridge which is initially balanced, then theoretically changes in temperature should not unbalance the bridge even if the individual gages are quite sensitive to temperature, that is, in theory, each of the four bridge arms will increase or decrease equal amounts so that bridge-balance is maintained. In practice, the cancellation of temperature drift by the foregoing method is far from perfect since the temperature characteristics of individual gages are not identical no matter how much care is observed in standardizing manufacturing procedures. The conventional bonded gages cannot be pretested individually for temperature characteristics since the resistance versus temperature response depends in part upon the installation as well as the material to which the gage is attached, and, of course, premounting of such gages for test purposes is impossible without destroying the gage since a bonded gage once installed cannot be readily removed. The weldable gages of my invention, on the other hand, offer means for improving the cancellation of temperature drift by the aforementioned four-arm bridge method because the temperature characteristics of individual gages are readily determinable before use. Once the characteristics are determined for individual gages, they can be matched according to these characteristics so that a set of four gages having substantially the same temperature versus resistance characteristics when connected in a bridge circuit will provide greatly increased compensation. Thus, the weldable gage can be clamped down along its flanges by any suitable mechanical clamping means to a bar of material corresponding to the material of the proposed test specimen on which the gage is to be used and the material may then be subjected to elevated temperatures. After a plot of resistance versus temperature is obtained for that material, the gage may be unclamped and is then ready for use, or, if desired, the gage may be further calibrated in conjunction with a different type of material. Following the determination of the characteristics of individual gages in this manner, the gages can be selected in sets of four having comparable temperature characteristics and these may be prewired and mounted on a thin metallic backing plate or other holding jig in ready-to-use form. In this connection, the use of the unitary filament-lead wire units in the gages of the invention further tends to eliminate temperature drift that might be caused by thermocouple action resulting from joined resistance wire and lead wire units. On the whole, the weldable gages offer temperature stability not attainable heretofore with conventional bonded or unbonded strain gages.

In line with temperature compensation measures, in a further embodiment of the invention illustrated in FIG. 40, I am able to compensate for possible thermal expansion of the strain gage housing by forming the housing, such as that used in FIGS. 18 and 19, as a bimetallic unit capable of insuring good coupling pressure at high temperatures. Thus, in accordance with this embodiment of the invention the housing is formed of two layers of different metals the outer shell 122 having a higher rate of expansion than the inner shell 123, whereby the outer shell will tend to force the walls of the inner shell against the insulating material as expansion occurs at high temperatures.

The strain gages of the present invention may be used in combination with conventional fittings for measuring a variety of physical quantities. That is to say, strain results from stress which in turn results from a force produced by pressure, acceleration, etc. Thus, a device sensitive to strain may be used to measure stress, force, pressure, acceleration, displacement, torque, among others. For example, a torque meter can be formed simply by equipping a shaft with four weldable gages. The gages can be installed in the same manner on rings, links, beams, tubes, etc. to provide sensing devices capable of measuring most physical quantities. In addition, the gages may be used in conjunction with known refinements relating to conventional gages such as high sensitivity resistance elements, conductive liquid (mercury) or gaseous resistance elements, temperature compensating resistance elements (bimetallic), etc.

Apart from the many advantages of the gages of my invention as have been pointed out in the foregoing description, it is also important to mention that the resistance to ground (between resistance element and the test specimen) is unaffected by installation and therefore can be specified and guaranteed to the consumer. The insulation characteristics of a conventional bonded gage cannot be determined prior to installation since it is affected by the installation. Actually, in some instances where a bonded gage is installed on a rough surface, the gage insulation (paper and bonding cement) gets punctured and a short to ground results. This cannot occur with a weldable gage since the insulation is disposed between its own housing and the fine resistance element. The housing is directly and deliberately grounded to the test specimen by welding but the insulation surrounding the resistance wire remains undisturbed. That is to say, the installation procedure is conductive in nature rather than insulating, and cannot affect the resistance to ground characteristics of the unmounted gage. Furthermore, the metallic housing provides electrical shielding for the resistance element as well as protection against damage through handling or misuse. In actual tests conducted with typical gage structures of the invention, it is further found that they are not affected by radiation phenomena as is the case with known forms of bonded gages.

As an alternative method of mounting the gages of the invention, and, incidentally, a method that may be employed in connection with known gages of the type which are customarily destroyed upon removal and which makes possible the removal and reuse of even this type of gage, I employ a source of heat in conjunction with a heat-sensitive bonding agent, such, for example, as beeswax or commercially available De Khotinsky (Tradename) cement. The surface of the test specimen is heated at the point of attachment of the gage with any suitable heating means such as a welding torch or blow torch and the bonding agent is then contacted with the heated area until it becomes fluid or starts to flow, covering an area slightly larger than the gage mounting surface. The gage is then pressed down into the fluid bonding agent and the heat source removed to permit the bond to set. To remove the gage after use, I simply re-apply heat around the area of the test specimen to which the gage is mounted until the bonding substance softens sufficiently to permit lifting of the gage structure. The gage may then be remounted in any other desired location by the same procedure. Of course, the gages of the present invention are particularly well suited to this method of mounting. In testing the foregoing method of mounting with known gage structures, however, I have successfully mounted a Baldwin SR-4 Type C-3 gage with beeswax as the bonding agent on an aluminum cantilever beam and obtained favorable results upon comparing its output with that of another gage installed by standard procedures. The gage was successfully mounted and dismounted several times without damage to the filament.

As an important feature of the overall manufacturing techniques used in the production of the gages of the invention, I have found that they may be pre-stabilized against drifting by simply subjecting the completed gage structure to a curing cycle of approximately ten minutes duration at a temperature of approximately 850° F. For this purpose, the gages are cured, out of circuit, by simply placing them in an oven and heating to the desired temperature. The stability attained in this manner is rather unexpected and cannot be achieved with any other known form of gage.

Having thus described the subject matter of my invention, what it is desired to secure by Letters Patent is:

1. The method for producing a strain gage that comprises providing an elongated resistance element the resistance of which changes in accordance with forces applied longitudinally thereto and having non-strain responsive lead wires attached to each end thereof, applying to the surface of said element a continuous, solid, adherent covering of electrical insulating material, disposing the resulting insulation-covered resistance element within a thin, readily deformable tubular metal shell with said lead wires extending therefrom, permanently deforming said shell inwardly against said insulating material and thereby clamping the insulating material firmly between said shell and said resistance element, whereby the resistance element is mechanically coupled to the shell to receive, via said insulating material, forces applied longitudinally to the shell, and connecting said lead wires to means capable of detecting a change in the resistance of said element.

2. The method as claimed in claim 1, including the additional step of applying a continuous adherent metallic coating to said insulating material before application of said shell.

3. The method for producing a strain gage that comprises providing an elongated resistance element the resistance of which changes in accordance with forces applied longitudinally thereto, applying to the surface of said element a continuous, solid coating of an electrical insulating medium, thereafter depositing a metallic coating over said electrical insulating material, and attaching said coated element to a metallic base which is adapted to be bonded by welding to a test specimen.

References Cited in the file of this patent
UNITED STATES PATENTS

| | | |
|---|---|---|
| 1,973,629 | Hofer | Sept. 11, 1934 |
| 2,363,181 | Howland | Nov. 21, 1944 |
| 2,569,714 | Gregory | Oct. 2, 1951 |